A. H. HIEATZMAN.
GLIDING COASTER.
APPLICATION FILED JUNE 2, 1920.
1,422,203.
Patented July 11, 1922.
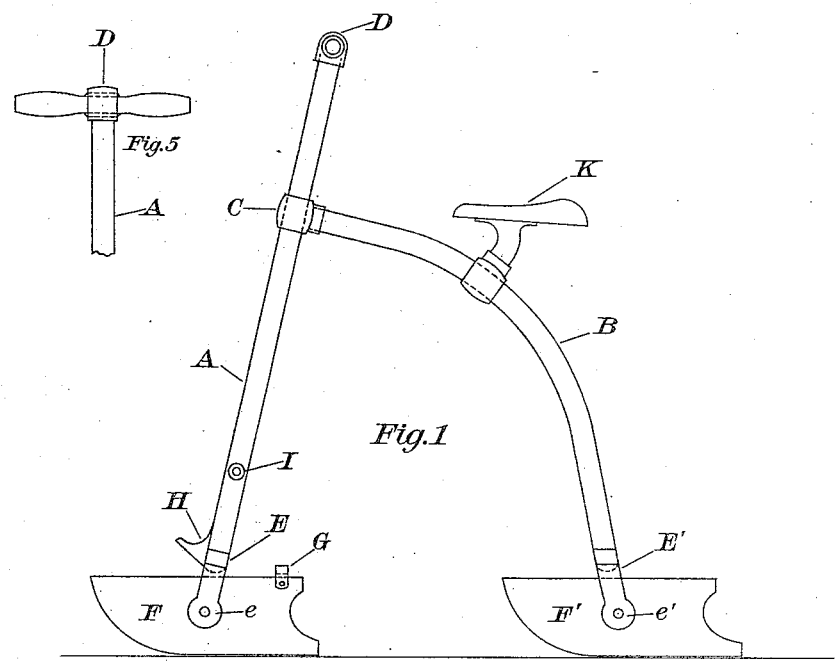
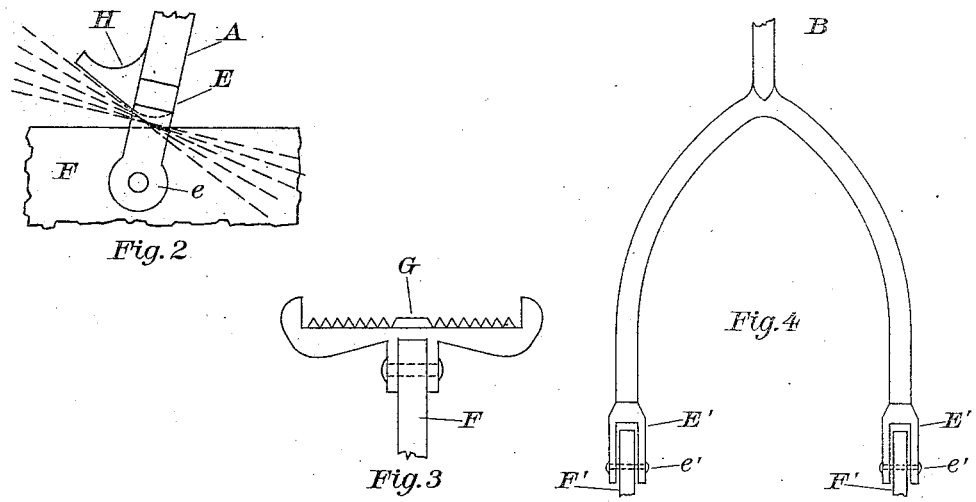
WITNESSES:
Paul Leibold
James A. Murray
INVENTOR:
Arthur H. Hieatzman

UNITED STATES PATENT OFFICE.

ARTHUR H. HIEATZMAN, OF BALTIMORE, MARYLAND, ASSIGNOR TO THE A. H. HIEATZMAN COMPANY, A CORPORATION OF OKLAHOMA.

GLIDING COASTER.

1,422,203. Specification of Letters Patent. Patented July 11, 1922.

Application filed June 2, 1920. Serial No. 385,893.

*To all whom it may concern:*

Be it known that I, ARTHUR H. HIEATZMAN, a citizen of the United States, residing at Baltimore city, in the State of Maryland, have invented a new, unique, and effective Gliding Coaster, of which the following is a specification.

My invention relates to an improvement in gliding coasters, one in which the rider has full control over its speed at all times even to the point of stoppage at will and I attain this object with the device shown and illustrated in the accompanying drawing, in which:

Figure 1 is a vertical side view of the device.

Fig. 2 a sectional side view of the front runner F with the fork E at the foot of section A, the dotted lines show how the front runner F can be caused at the will of the rider to assume any determined position (tending towards the vertical) other than the longitudinal.

Fig. 3 a rear view of the foot rest G used in operating the front runner F.

Fig. 4 a rear view below the saddle of a modification of the rear section B of the device.

Fig. 5 a front view in elevation of the handle bar D.

Similar letters refer to similar parts throughout the several views.

Referring to the drawing the device constitutes a frame having a front section A and a rear section B connected at C by a swivel movement which is operative and controlled by the handle bar D; at the foot of each section is a fork E and E', runners F and F' in tandem arrangement are pivoted at e and e' in the said forks and constitute the gliding feature of the device. On the top of the front runner F at its rear is located for convenience a foot rest G acting as an established elementary means for the purpose hereinafter described and set forth; within the upper part of the fork E at the foot of the front section A and extending out forward therefrom is provided a lug projection H; the front section A is further provided with a handle bar D and the regular bicycle foot rests I; the rear section B is provided with a properly located seat saddle K.

In operation the rider mounts the device at the summit of the incline placing the feet on the rests I in similar attitude as in bicycle coasting; should the speed become greater than desired the rider then changes the feet from the rests I to the rest G, a moderate bearing down thereon with a slight lift of the handle bar D with the hands will change the fulcrum and cause the front runner F to leave its longitudinal position for a semi-vertical one thereby causing the heel of the said runner F to dig in the surface which if continued will exert sufficient resistance to entirely stop the device, the projecting lug H is provided to prevent the front runner F being changed from its longitudinal position beyond a safe fixed or set degree. The pivoting of the back runner F' conjunctively with the front runner F permits the device to more readily take any topographical irregularities which may be in the incline or coasting surface.

I am fully aware that the bicycle and tricycle devices have been made for years prior to my invention I therefore do not claim the principal of either construction or combination broadly but I claim—

1. A device for coasting constituting a frame having front and rear surface bearings, a foot rest G attached to and cooperating with the front surface bearing for creating increased friction between the said bearing and the surface incline for the purpose of diminishing the speed of the device.

2. A device for coasting constituting a frame having front and rear longitudinal surface bearings, a foot operative means cooperative with the front longitudinal surface bearing for tilting the said bearing up out of its longitudinal position and a means obstructive to prevent it being tilted upward beyond a predetermined fixed point.

3. A device for coasting constituting a frame having front and rear longitudinal surface bearings pivoted in tandem thereon, an established elementary means for tilting one of the said longitudinal surface bearings on its pivot connection for the purpose of creating increased friction between the said bearing and the surface incline, therewith diminishing the speed of the device.

4. A device for coasting constituting a frame having front and rear longitudinal surface bearings pivoted in tandem thereon, an established elementary means for tilting one of the said longitudinal surface bearings on its pivot connection for the purpose of creating increased friction between the said bearing and the surface incline therewith diminishing the speed of the device, and a means obstructive to prevent the said longitudinal surface bearing being tilted upward beyond a predetermined fixed point.

ARTHUR H. HIEATZMAN.

Witnesses:
 PAUL LEIBOLD,
 JAMES A. MURRAY.